Jan. 31, 1967   I. H. S. HENDERSON   3,302,091
COULOMETRIC DEVICE
Filed April 22, 1963   3 Sheets-Sheet 1

INVENTOR
IAN H. S. HENDERSON
BY- Smart & Biggar.
ATTORNEYS

Jan. 31, 1967   I. H. S. HENDERSON   3,302,091
COULOMETRIC DEVICE

Filed April 22, 1963   3 Sheets-Sheet 2

INVENTOR
IAN H.S. HENDERSON
BY- Smart & Biggar.
ATTORNEYS

Jan. 31, 1967     I. H. S. HENDERSON     3,302,091
COULOMETRIC DEVICE

Filed April 22, 1963     3 Sheets-Sheet 3

INVENTOR
IAN H.S. HENDERSON
BY- *Smart & Biggar*.
ATTORNEYS

United States Patent Office 3,302,091
Patented Jan. 31, 1967

3,302,091
COULOMETRIC DEVICE
Ian H. S. Henderson, Ottawa, Ontario, Canada, assignor to Her Majesty the Queen in right of Canada as represented by the Minister of National Defence
Filed Apr. 22, 1963, Ser. No. 274,458
9 Claims. (Cl. 320—48)

This invention relates to a novel type of coulometer and its application in controlling electric circuits, and more particularly to its application in the charging of secondary batteries.

It is a well established electrochemical principle that the amount of chemical change produced by passage of an electric current through an electrochemical cell is directly proportional to the product of the magnitude of the current and the time for which it is passed, that is, directly proportional to the quantity of electricity, or coulombs, passed. Application is made of this principle in devices known as coulometers, in which the quantity of electricity is determined, for example, from the gain or loss in weight at an electrode, from the change of concentration of a substance in one compartment of a cell (by titration or by measurement of the change of colour intensity), from the movement of a gap in a mercury column, or from the volume of gas liberated when electric current has been caused to pass through the device. As an example, the International Ampere is defined as that current which results in the deposition of 0.00111800 gram of silver per second in a silver coulometer.

In general, the limitations of such devices are that high currents cannot be passed through them and that the measurement, although precise, involves, weighing, or some visual or chemical determination of the change produced.

The coulometer of the present invention is capable of operation at high current, and the method of measurement employed makes remote, unattended operation possible. The device is reversible, and in one embodiment, gives an indication, after passage of a quantity of electricity through it in one direction, of the time when an an equal quantity of electricity has flowed in the opposite direction. The indication given by the device is an electric signal, which can be used for controlling electric circuits. It is clear that useful application of such an indication of time can be made, for example, in storage battery recharging.

A storage, or secondary battery is re-charged by the passage of electric current through the battery until the quantity of electric charge passed (that is, the product of charging current and duration of charging) is equal to or greater than the charge removed during discharge (that is, the product of discharge current by duration of discharge). When charging is completed, further passage of current in the charging direction results in wasteful electrolysis of the electrolyte with attendant gas evolution, and, in a vented type of battery, periodic addition of water is necessary to compensate for this loss. In some applications, the use of hermetically sealed batteries is necessary, and in this case, overcharging must be rigorously controlled to prevent excessive accumulation of gas(es). Otherwise, the accumulation of gas(es) generated on overcharge may result in a pressure build-up sufficient to produce explosive rupture of the battery container.

In practice, battery charging current is controlled in one of the following ways. (a) Charging may be carried out at a constant potential chosen so that as the battery approaches full charge the back E.M.F. of the battery itself balances the applied voltage and the current flow is thereby reduced. In many applications this method is not completely satisfactory since (i) the current reduces rapidly to such a low value that charging requires a long time and (ii) it is difficult to vary the applied constant potential to compensate for changes in the back E.M.F. of the battery when the latter is charged at different temperatures. In general, the back E.M.F. of the battery during charging increases as the temperature is lowered and a voltage regulator setting which permits full charging at reduced temperatures results in severe over-charging at normal or higher temperatures. (b) Charging may be carried out by a constant current whose value is chosen as one which the battery can tolerate on continuous overcharge. In general this current is so low that an undesirably long time is required to recharge the battery. (c) The charging may be carried out by a modification of these two techniques. For example, part of the charging may be accomplished by a relatively high constant current, followed by completion of the charging at a lower constant current as defined by (b). Alternatively, the charging may be carried out at a high constant current until the back E.M.F. of individual cells in the battery attains a given value of voltage as defined in (a) and then the current can be reduced. The desired potential is generally determined by voltage-sensing devices which measure the total voltage of the battery. However, in a battery consisting of a number of cells in series, there is sufficient variation in the voltage from cell-to-cell to warrant extreme caution in the use of this method for the determination of the time at which the battery is fully charged. In general, therefore, this method is strictly applicable with hermetically sealed batteries to situations in which monitoring of the individual cell voltages can be carried out, as for example in a laboratory.

In many applications for secondary batteries (such as in vehicle or satellite use) such monitoring is not feasible. The device described below overcomes many of the objections to the above methods of charging and permits automatic control of the charging conditions by providing a direct indication of the time when an amount of electric charge has been replaced which equals the amount withdrawn during the preceding discharge, and independently of the method of charging employed, provides a means of limiting or cutting off the charging current.

Throughout this specification, "potential" is defined as that particular value of voltage measured on open circuit, whereas the term "voltage" is taken to mean the value obtained during passage of electric current.

The invention comprises an electrochemical cell having a pair of reversible electrodes immersed in an electrolyte. The electrodes having substantially the same electrode potential so that the voltage across the cell is small. The cell is adapted to develop a substantial and abrupt change of voltage between its electrodes when more than a definite quantity of electricity has passed through the cell, corresponding to the onset of a change in the electrochemical process occurring at one or both electrodes, such as the onset of gas evolution. This increased voltage is then used as a controlling signal in an electric circuit, or as an indication that the definite quantity of electricity has passed through the cell.

Preferably, the electrodes are chosen to have the same electrode potential, but "substantially the same electrode potential" (as used above) means that the difference between the electrode potentials is less than the voltage which develops across the cell when more than the definite quantity of electricity has passed through the cell, so that the change in voltage can control an electric circuit. Usually the difference between the electrode potentials will be less than 0.25 volt. Accordingly, the "substantial" change in voltage is one which, having regard for the difference between the electrode potentials, is yet large enough to control an electric circuit. The abruptness with which this voltage change takes place varies with the design of the cell, but in any case, this voltage change is abrupt compared to any voltage changes which may have taken place shortly before the definite quantity of electricity had passed through the cell, i.e. which may have taken place during the preceding portion of the cycle during the entire period before the onset of the change in the electrochemical process.

Electric current passing through the cell causes oxidation of the active material at one electrode and reduction of the active material at the other electrode, the amount of oxidation and reduction being proportional to the quantity of electricity which passed through the cell. Electric current passing through the cell in the reverse direction causes the electrode reactions to proceed in the reverse directions. Passage of a quantity of electricity through the cell in the reverse direction, equal to the quantity of electricity which previously passed through in the forward direction, returns the electrodes to their initial state of oxidation. When a quantity of electricity has passed through the cell sufficient to oxidize all the active material at one electrode and/or reduce all the active material at the other electrode, further passage of electric current results in the commencement of a change in the electrochemical process occurring at one or both electrodes. This change in electrochemical process may be, for example, the onset of gas evolution. In the case where hydrogen is given off at one electrode, and oxygen at the other electrode, the voltage tends to rise to at least 1.23 volts, since this is the theoretical minimum voltage at which these two gases can be evolved simultaneously. The quantity of electricity that must pass through the cell before the voltage begins to rise can be automatically set at the appropriate value imposed by the electrical history of the cell, or a maximum can be set by constructing the cell with a predetermined amount of active material. The increased voltage indicates that a particularly quantity of electricity has passed through the cell; this increased voltage can be used to control an electric circuit, as for example, a secondary battery charging circuit.

In the preferred embodiment of the invention the oxidation and reduction reactions are the same at both electrodes, although the reactions proceed in opposite directions at the two electrodes. For example, if the oxidation reaction is $Cd + 2OH^- \rightarrow Cd(OH)_2 + 2e^-$ then the reduction reaction at the other electrode is $$Cd(OH)_2 + 2e^- \rightarrow Cd + OH^-$$

This ensures that the electrode potentials are substantially the same and allows simple construction of the cell. However, a cell having electrodes incorporating two different active materials in which different reactions occur would be suitable, provided the unlike electrodes had substantially the same electrode potential. The allowable difference between the electrode potentials in a cell of this type will depend on the application in which the cell is to be used.

The preferred embodiment employs as electrodes an electrically conducting support material together with an active material consisting either of a metal e.g. Cd and an insoluble salt of that metal e.g. $Cd(OH)_2$, or of an insoluble mass capable of exhibiting a variable valence in one of the constituents of the mass e.g. electrochemically active nickel oxides or manganese oxides. In operation, the active material goes into its higher valence state at the oxidation electrode and its lower valence state at the reduction electrode e.g. at the oxidation electrode $Cd \rightarrow Cd(OH)_2$ or $Ni^{++} \rightarrow$ higher Ni oxides, at the reduction electrode $Cd(OH)_2 \rightarrow Cd$ or higher Ni oxides $\rightarrow Ni^{++}$. However, as it is clear to one skilled in the art, other types of electrode systems are possible.

As an example, one electrode may consist of a support material such as platinum, with a coating of active material such as metallic copper, and the other electrode may consist of the same support material without any active material initially. The electrolyte in this case would be a solution containing copper ions. In operation, the reaction at the oxidation electrode would be $$Cu \rightarrow Cu^{++} + 2e^-$$

and the reaction at the reduction electrode would be $$Cu^{++} + 2e^- \rightarrow Cu$$

resulting in plating of the copper from one electrode to the other. Another possible type of electrode system is one in which the electrodes are of an unattackable metal such as platinum, immersed in a solution containing an appropriate oxidized and reduced form of an oxidation-reduction system e.g. $Sn^{++++}$ and $Sn^{++}$, with a suitable electrolytically conducting diaphragm, such as a porous ceramic material impregnated with electrolyte.

The electrochemical cell of this invention can be constructed with a known electrical capacity (ampere-hour capacity) so that the increased potential difference will occur when the oxidation and/or reduction reaction has gone to completion in one direction. The cell can be used again simply by reversing the direction of flow of electric current through the cell.

In another embodiment of the cell its electrical capacity is greater than the quantity of electricity which will be passed through it in the application for which it is designed. Initially the active material at one electrode is in the oxidized state and at the other electrode in the reduced state. Electric current is passed through the cell in the direction to reduce some of the oxidized active material and to oxidize some of the reduced active material. Electric current is then passed through the cell in the reverse direction, and when a quantity of electricity has passed through the cell equal to the quantity of electricity which previously passed through in the forward direction, the electrodes are once again in their initial state of oxidation. At this point further passage of electric current in the reverse direction results in the tendency towards gas evolution and the accompanying increase in voltage.

In drawings which illustrate embodiments of the invention and its operation and application;

Table I is a list of typical (but not all) electrode systems which can be used in the invention, and the electrode reactions on discharge and charge when the cell is used in series with a secondary battery.

Figure 1:
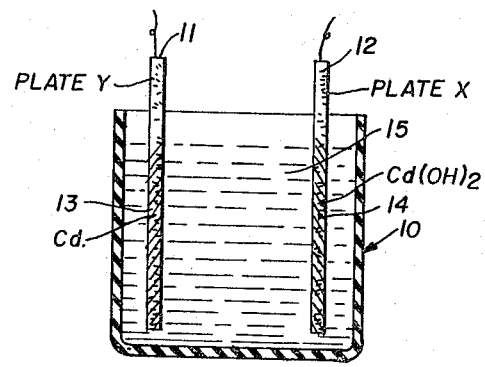
FIGURE 1 is a cross-section of one embodiment of the cell.

Referring now to FIGURE 1 of the drawings, the cell may consist, for example, of an electrochemical cell generally designated 10 containing two sintered nickel plaques 11 and 12, impregnated with cadmium 13 and cadmium hydroxide 14, respectively, physically not in contact with one another but with each individually connected to an external electrical circuit (not shown). The cell contains also an electrolyte 15 such as potassium hydroxide solution through which electrolytic contact is maintained between the plates. One such plate, plate X, is in the oxidized condition (with the cadmium present as cadmium oxide or hydroxide); the second plate, plate Y, is in the reduced condition (with the cadmium present as cadmium metal). The cell is placed in series with the battery with such polarity that the discharge of the battery results in the reduction of some of the cadmium oxide or hydroxide of plate X to metallic cadmium and the oxidation of some of the cadmium of plate Y to cadmium hydroxide. As long as both cadmium and its hydroxide are present in each plate, the voltage between these plates remains small, even during passage of current. When discharging is stopped and charging commenced, the material in plate X oxidizes and in plate Y reduces. When all of the cadmium in plate X is oxidized the voltage at this plate increases abruptly and oxygen evolution commences at this plate. Simultaneously, all the cadmium hydroxide in plate Y is reduced to cadmium, and further passage of current results in an abrupt decrease in the voltage at this plate and hydrogen evolution commences. This abrupt increase of voltage across the cell occurs only when an amount of charge has been put into the cell (and hence also the battery) which equals the amount withdrawn during the preceding discharge. This abrupt voltage change may, as shown below, be utilized in a number of ways to control the charging of a secondary battery.

Figure 3:
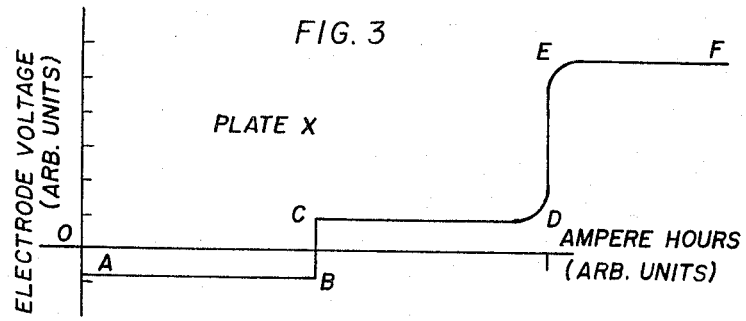
FIGURE 3 is a graph of electrode voltage vs. ampere-hours for plate X of the cell of FIGURE 1.
Figure 4:
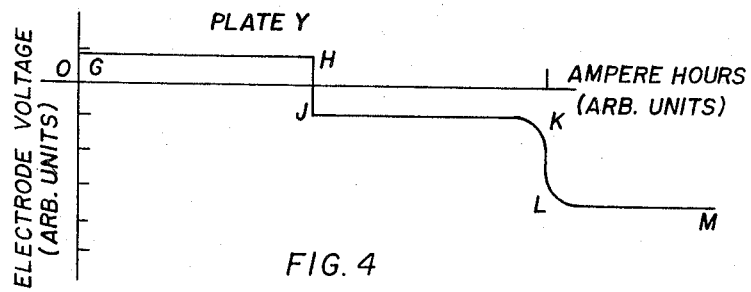
FIGURE 4 is a similar graph for plate Y.

FIGURES 3 and 4 illustrate diagrammatically the behaviour of the individual plates X and Y, respectively. Considering first the operation of plate X, and plate initially oxidized; discharge of the battery in series with the device results in a drop in voltage from O to A because of internal resistance and polarization inside the device. This voltage remains sensibly constant until after the discharge is terminated at point B, when the potential returns to zero. Imposition of charging current produces a similar but converse change in voltage from zero to point C, and during charging of the battery, the voltage across the plate remains constant up to point D, when the voltage rises abruptly to E and oxygen evolution commences. The essential feature of this device is that the distances A–B and C–D are approximately equal, and if A–B is decreased or lengthened, C–D is also decreased or lengthened by a like amount. Region A–B represents reduction of cadmium hydroxide to cadmium; C–D represents oxidation of cadmium to cadmium hydroxide; and E–F represents evolution of oxygen.

The operation of plate Y as shown in FIGURE 4 is in some respects the converse of the operation of plate X. G–H represents oxidation of cadmium to cadmium hydroxide; J–K the reduction of cadmium hydroxide to cadmium; and L–M the evolution of hydrogen. Further, approximate equality also exits between G–H, J–K, A–B, and C–D.

The net voltage displayed by the device in each of its several regions of operation is the sum of those magnitudes, disregarding signs, in FIGURES 3 and 4. For example, during discharge of the battery, the drop across the device is $AO+OG$. In a trial conducted in the laboratory on such a device this amounted to 0.1 volt. The actual magnitude reported here is not of significance in that it can be made lower or higher at will, since it will be obvious to one skilled in the art that the smaller the current and the larger the effective plate area, the smaller will be the voltage across such a system. During the charging of the battery, the voltage across the device is initially $JO+OC$. The magnitude of this voltage is also a function of current and effective plate area and by appropriate design, made relatively small. However, the voltage as charging is completed is primarily a function of the oxygen and hydrogen evolution potentials in this system as well as of the magnitude of the current and thus the sum $EO+OL$ is always at least 1.5 volts and can rise to values in excess of 2.0 volts when the current density is high. As described below, this abrupt voltage change can be utilized to control the charging of a battery.

Figure 2:
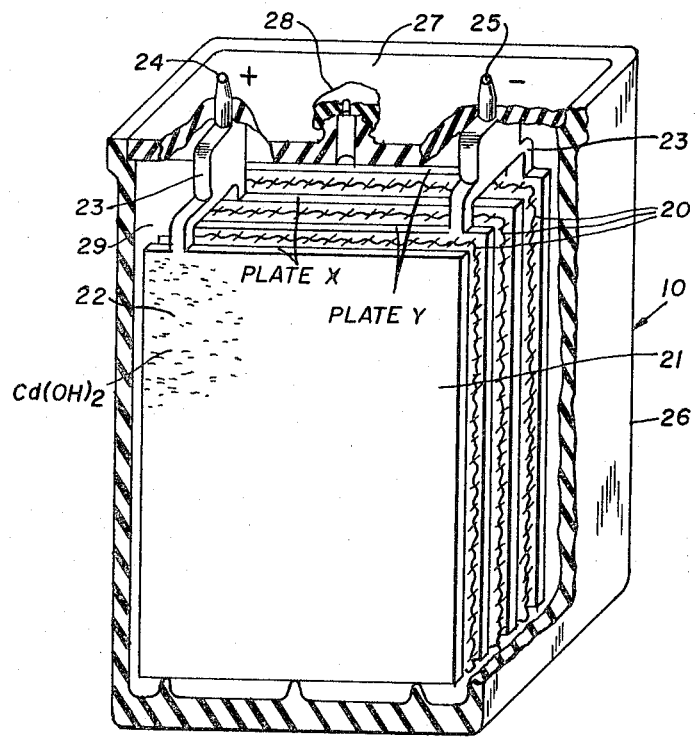
FIGURE 2 is a perspective view partly in section of another embodiment.

In another embodiment shown in FIGURE 2, the device consists of a number of plates X and Y alternately arranged and a thin woven nylon cloth 20 separating the plates. The plates can be obtained from a discharged, dismantled alkaline storage battery of the sintered plate nickel-cadmium type, and consists of a porous sintered nickel-support 21 in the pores of which a thin layer of cadmium hydroxide 22 has been deposited. Metal tabs 23 welded to plates designated X are connected together and to an external electrical connection 24 labelled positive. The plates designated Y are similarly connected together and to the external electrical connection 25 labelled negative. The plate assembly is placed in an outer container 26 of alkali inert material such as plastic, nylon or metal such as nickel or stainless steel, shaped as a rectangular solid. A top 27 is provided for this container through which the electrical connections 24 and 25 to the plates are passed, and through which a vent 28 is provided for filling with electrolyte 29 and the escape of gases during initial charging.

After cell assembly, an amount of 20–30% KOH solution is added which is sufficient to saturate the separator material 20, fill the pores in the plates and to cover the plates with liquid. At this stage, the active material on both plates is cadmium oxide or hydroxide. Current is passed through the cell in such a direction as to reduce the material on plate Y to metallic cadmium and to evolve gaseous oxygen from plate X. The evolved oxygen is permitted to escape through the vent 28 in the cell. When a quantity of electricity has passed which is sufficient to reduce all of the active material on plate Y to metallic cadmium, the current flow is interrupted. It has been observed that some oxidation of the nickel support material of plate X occurs during passage of the current in this formation stage, and that the electrochemical capacity developed in this plate as higher nickel oxide corresponds to 5–10% of that of cadmium in plate Y. This is easily removed either by short-circuiting the cell or by reversal of current flow in the cell until the voltage of the cell becomes zero. Thus in the initially charged state, plate X has substantially all of its active material in the form of $Cd(OH)_2$, and plate Y has 5–10% of its active material in the form of $Cd(OH)_2$ and the rest in the form of Cd. This means that when a quantity of electricity has passed through the cell in the reverse direction equal to the quantity which had previously passed through in the forward direction, there will be a tendency towards oxygen evolution but no hydrogen evolution since there is still some oxidized material left at plate Y. This is advantageous as noted later.

The cell vent is now closed to prevent entrance of oxygen which would react chemically with the Cd of plate Y to form $Cd(OH)_2$ and further decrease its capacity and to prevent the entrance of carbon dioxide which contaminates the electrolyte. The cell is then used to control the charging of a battery.

In yet another embodiment, the device can be constructed by modifying a hermetically sealed alkaline secondary battery of the nickel-cadmium type, having a capacity of about 5 ampere-hours, a type which is employed in satellite, applications. The modifications made to the cell are as follows: (i) a 2 inch length of ⅛ inch outside diameter, 1/16 inside diameter stainless steel tubing is inserted through a ⅛ inch diameter hole drilled in one end of the bottom casing of the cell so that this tube penetrates the interior of the cell no more than 1/16 inch. The tube is then welded in place using argon arc-welding techniques, (ii) the positive plate of the battery is replaced by a negative plate removed from a second, similar battery (iii) excess electrolyte over that normally employed in hermetically sealed batteries is added to ensure the presence at all times of free, liquid electrolyte in order to reduce the resistance of the cell to a minimum. The device is then "formed" as in the above example before the filling tube is sealed.

In another embodiment plate X may consist of an inert metal such as platinum, and plate Y of the same support metal on which a metal such as copper has been deposited. The electrolyte would be a solution containing copper ions. During discharge of a battery connected in series with the device, copper metal would be plated onto plate X and dissolved from plate Y. During re-charging, the voltage across the device would remain low as long as copper remained on plate X. An abrupt change in potential difference would occur when all the copper had been removed from plate X, corresponding to the onset of oxygen evolution at the platinum electrode.

The construction features of the device described herein are similar in many respects to those of conventional secondary batteries, with the important difference that whereas in secondary batteries, positive and negative electrode materials are chosen to have as high an open and closed circuit voltage as possible, the plates in the present invention are chosen to have very small open-circuit voltage. This is achieved by using the same electrode active material in both plates—in one plate it is predominately in a reduced form, and in the other, predominately in an oxidized form. In the embodiments described, for example, one plate consisted predominately of cadmium metal finely dispersed within the pores of a sintered nickel support, while the other plate consisted predominately of cadmium oxide or hydroxide finely dispersed within the pores of an identical sintered nickel support.

CONTROL OF CHARGING CURRENT (a) During constant potential charge two possibilities are considered. When the voltage regulator can be set to operate within a 1.5 v. range, the device itself affords adequate control by ensuring that at the conclusion of charge the total E.M.F. across the battery and the device is sufficiently high to ensure control by the voltage regulator over the temperature range at which the battery is to be charged. When the regulator is not capable of controlling within a 1.5 volt range, two of these devices could be used in series with the battery to extend the range to 3.0 v. etc. Alternatively, the voltage developed by the device could be used indirectly to control the voltage regulator relay or other equivalnt circuitry which limits or cuts off the charging current. Thus in such an application, the device described herein supplements voltage regulators, for example in vehicles, and enables more precise control of charging independently of temperature variations.

Figure 5:
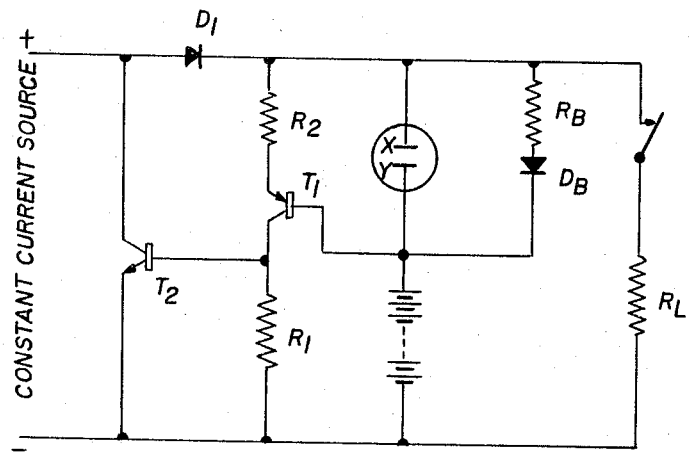
FIGURE 5 is a schematic diagram of a circuit using a cell to control overcharging of a secondary battery.
Figure 6:
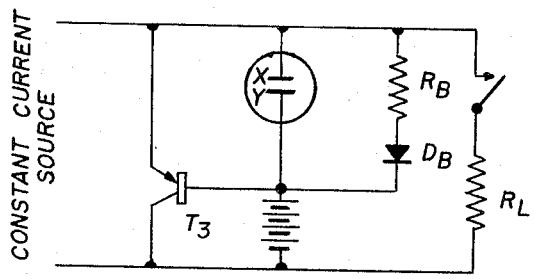
FIGURE 6 is a schematic diagram of another circuit to control overcharging.

(b) During constant current charging, it has been found convenient to employ an electronic circuit controlled by the voltage across the device, to enable the by-passing of some or, where necessary, virtually all of the available charging current when the battery has attained full charge. Such a circuit, designed to control the charging of sealed nickel-cadmium batteries by solar cells in a satellite application is shown in FIGURE 5. In this application of the device, one ampere-hour was removed from the battery on discharge, and charging was carried out at a rate of 0.400 ampere. After one ampere-hour was replaced on charging, the voltage in the sensing device commenced to rise. This voltage was amplified by transistor $T_1$, and the amplified signal used to control the current through transistor $T_2$. The characteristics of this circuit were such that when the sensing device E.M.F. was 0.5 volt, transistor $T_2$ carried practically the entire charging current and no current passed through the battery. An alternate circuit employing a single transistor is shown in FIGURE 6. With this circuit, charging was carried out at 2.5 amperes until the quantity of electricity removed was replaced, at which time the current was reduced to 0.15 amp.

Because, in general, the charging efficiency of a secondary battery is not 100%, particularly toward the completion of charging, it is desirable to employ a somewhat larger quantity of charge than was used during discharge. Hence it is most convenient to use this device to limit the current to a safe value for continuous overcharge rather than cut off the current completely. This is easily achieved. In the circuits shown, the device is shunted with the series combination of resistor and diode shown as $R_B$ and $D_B$ in FIGURES 5 and 6. The diode is required to prevent passage of current through resistor $R_B$ during discharge of the battery (which would introduce an error in measurement of quantity of electricity removed). In many applications the diode $D_B$ would not be required, since the effective resistance of the device would be very much smaller than that of $R_B$, except when a high voltage drop across the device indicates that the battery is fully charged. It may be pointed out that because the voltage drop across the device is very close to zero when the battery is on open circuit, there will be very little or no discharge of the device through $R_B$ on open circuit whether or not diode $D_B$ is employed. The particular value of $R_B$ chosen for the circuit depends upon the type of battery employed and on the upper limit of voltage chosen for the operation of the device. For example, if it is known that a practical overcharging current for a given battery is 0.1 ampere and the circuit is designed to by-pass a maximum fraction of the total charging current of 0.5 amp when the sensing voltage of the device is 0.5 volt, an appropriate value of $R_B$ would be 5 ohms. It is suggested that the currents through the various branches of the circuit would be: (a) approximately 0.1 ampere through $R_B$ and the battery (b) approximately 0.4 ampere through transistor $T_2$ (c) a relatively much smaller current (say 0.001 ampere), through the device (d) a small current through the branch composed of $R_2$, $T_1$ and $R_1$, and (e) the relatively small control currents in the transistors. It is obvious to one skilled in the art that innumerable variations of the electronic circuitry can be designed to perform the current-limiting function desired, providing the control voltage developed by the device is available. What is important is that this device provides a unique method of determining when a battery being charged has accepted close to its full charge.

Values for the components of FIGURE 5 which have given good resutls are the following:

$R_1$—3300Ω
$R_2$—18Ω
$R_L$—Load resistance
$R_B$—Resistance to match operating conditions
$T_1$—Transistor, 2N188
$T_2$—Transistor, 2N1047
$D_1$—Silicon diode, 1N2071
$D_B$—Silicon diode to match operating conditions
$S_1$—Load switch
X—Plate X
Y—Plate Y The following component values for the circuit of FIGURE 6 have given good results:

$T_3$—Transistor 2N627, Motorola
$R_B$—0.5Ω
$D_B$—Transistor 2N278 with emitter to collector shorted out It is of importance in the design of such a device that the total available electrical capacity of the device be at least equal to the electrical capacity of the battery, or to that fraction of the battery capacity which is to be utilized, to ensure a reasonably accurate measure of the quantity of electricity removed during discharge. It is also of great importance that the device be capable of charge and discharge with little "polarization" (that is the sums $AO+OG$ and $JO+OC$ must be small) at rates of charge and discharge required by the battery being controlled.

Further modifications and advantages may be noted. Because the device is essentially a zero-voltage secondary battery except when fully charged, the behaviour of the device when subjected to changes of temperature may be expected to more closely parallel the behaviour of the battery it is regulating than will solid-state and other non-electrochemical devices. When circuits such as described in FIGURES 5 and 6 are employed, a further advantage becomes apparent. The maximum voltage developed by the device can be easily limited to say 0.5 v., a voltage at which gas evolution cannot occur. In order to further ensure that no gas is evolved within the cell, it is desirable that initially one plate have all its active material in the oxidized state, and that the other plate have an equal quantity of active material in the reduced state together with a 5–10% excess of active material in the oxidized state. This prevents hydrogen evolution on overcharge, since the excess reduction of the excess oxidized material takes place first. In some cells it is desirable to have one plate initially with all its active material reduced, and the other plate with an equal quantity of active material oxidized together with 5–10% excess active material reduced. Under these conditions the device can be hermetically sealed and operated in conjunction with sealed batteries at reduced external pressures as in a satellite.

It is obvious to one skilled in the art that the electrode systems described are not the only ones that could be employed in such a device. In practice virtually any electrode that is commonly used or could be used as an electrode in a secondary battery may be employed in this invention. A partial list of electrode pairs, and the reactions during discharging, charging and overcharging is given in Table I with suggested electrolytes. The use of a secondary battery-type electrode is suggested because of the requirements for (a) reversibility, (b) large capacity per unit weight and volume, and (c) because of the demonstrated ability in some instances to deliver and accept current at high rates with low "polarization."

When the invention is to be employed with circuits in which the voltage developed by the device is strictly limited to values below which no gas evolution or secondary reaction can occur on overcharging (as, for example, in conjunction with hermetically sealed batteries) any of the systems tabulated could be employed. However, when this limitation is not imposed on the system (which would be the suggested method in normal vehicle use with vented batteries), the list of Table I may be restricted to systems in which only two valence states are exhibited by the metal involved. Examples of such systems are (1), (4) and (7) of Table I. The remaining systems would not integrate reversibly when the device voltage is allowed to vary in an uncontrolled manner or overcharge as in the above examples and further would develop a residual electrical capacity as batteries and have a voltage quite different from zero when an open circuit. By-passing the device with a suitably chosen resistor or resistor plus diode combination as $R_B$ or $R_B+D_B$ (FIGURE 5) would adequately limit the device voltage so that any of the systems listed in the table could be employed in all applications. In this instance the value of the resistor is evaluated as the ratio of the total allowable voltage across the device on overcharge to the maximum current available from the charging circuit.

A particular application for a smaller capacity variation of the type of coulometer which plates a metal from one electrode to the other will be described now. Primary batteries of the zinc-mercuric oxide type have both a very long shelf life and a very stable open circuit voltage. There is a need for an inexpensive device to indicate when such batteries have delivered a large fraction of their useful life during normal discharge, in order to prevent the discarding of usable batteries during normal maintenance checks. In such an application, plate X of the coulometer would have an amount of a metal, for example copper, corresponding to 75% or so of the capacity of the primary battery in series with it. During discharge of the battery, copper would be removed from this plate and be deposited on plate Y, and the voltage would remain low as long as copper remained on plate X. The end of useful battery life would be indicated by an abrupt rise in voltage across the device or a decrease of total battery voltage (corresponding to oxygen evolution at plate X during normal discharge of the battery). (Clearly, in the field, the device could then be short circuited and further use of the battery made possible, with battery replacement to be carried out as soon as convenient, the function of the device having been fulfilled in indicating the approach to end of useful battery life.)

An alternate and cheaper coulometer than the one just described which plates copper from one electrode to the other, is a coulometer having zinc or amalgamated zinc as the electrode active material. The construction of such a coulometer is similar to that of a Zn–HgO battery except that the positive active material (HgO) is omitted. The amount of zinc corresponds to say 75% of the capacity of the primary battery to be used in series with the coulometer. The electrolyte is neutral or alkaline ammonium salts or KOH+ZnO. The reaction occurring at plate X during discharge of the primary battery is $Zn \rightarrow ZnO_2^{--}$ with deposition of zinc occurring at plate Y. The approach to the end of useful life of the battery is indicated by an abrupt change of voltage of the coulometer cell corresponding to complete utilization of the zinc at plate X at which oxygen evolution then commences.

USE OF A SIMILAR DEVICE TO DETERMINE "STATE-OF-CHARGE"

Up to the present time there has been no satisfactory method for determining the "state-of-charge" of batteries of the nickel-cadmium type since the change of electrolyte concentration and change of open circuit voltage are both small as the battery proceeds from a state of full charge to almost complete discharge. The most suitable method developed has been to complete the discharge of a battery and completely re-charge the battery, a very laborious procedure.

One embodiment of the novel coulometer described herein may be used to give an approximate indication of the "state-of-charge" of a nickel cadmium battery in addition to controlling overcharging current. For this application the coulometer consists of at least two electrodes or plates, designated X and Y together with suitable container, external connections, electrolyte, separator etc. The active material is one which exhibits a continually varying potential as the average oxidation state of the active material is varied by passage of electric current through the cell. If the cell is electrically connected in series with the battery, and the current passing through the cell is the discharge current from the battery, then the open circuit potential difference of the cell is a measure of the state of charge of the battery. Of course the cell can additionally perform its function of controlling overcharging current. In the preferred embodiment the support material is highly porous nickel metal, and the active materials dispersed within and on the surfaces of the pores are electrochemically active manganese oxides; on plate X the active material is predominately divalent or trivalent manganese and on plate Y, predominately the higher valence associated with the "charged" manganese dioxide electrode. The electrochemical capacity of each of plates X and Y approximates that of the battery in conjunction with which the device is to be used. The electrolyte is neutral or alkaline solution, for example KOH.

Figure 7:
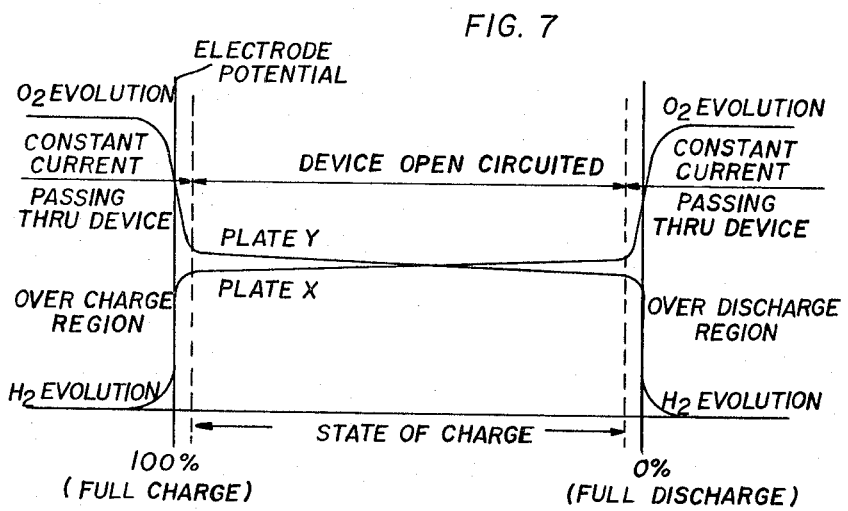
FIGURE 7 is a graph of electrode potential vs. state of charge for another embodiment (not shown)

In use, the device is placed in series with the battery so that during normal discharge and charge, the current flow through the device and the battery is the same. An illustration of the operation of such a device is provided by FIGURE 7.

Figure 8:
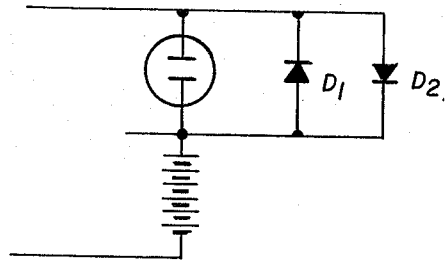
FIGURE 8 is a schematic diagram of the circuit to protect the embodiment of FIGURE 7.

The region to the left of 100% on the abscissa corresponds to overcharge of the device (and the battery) with oxygen evolution occurring from plate Y and hydrogen evolution from plate X. The region to the right of 0% on the abscissa corresponds to overdischarge, with oxygen evolution from plate X, and hydrogen evolution from plate Y. Intermediate points going from 100% to 0% corresponds to an increasing proportion of divalent or trivalent manganese on plate Y and a decreasing proportion of divalent or trivalent manganese on plate X. The voltage between plates X and Y as measured with a center-zero voltmeter gives an indication of the state of charge, the magnitude of the voltage being a maximum at full charge, zero at approximately 50% charge and a minimum at full discharge, with all readings between 0 and 100% being taken at open circuit. Typical values of the maximum and minimum voltages are plus and minus 0.1 volt, respectively. The voltage readings in the overcharge and overdischarge regions are taken with constant current flowing through the cell. It is not necessary that the capacity of the device be identical with that of the battery, since cell-to-cell capacity variations in the battery can be greater than ±10%. However, it is desirable to prevent further reduction of the divalent nickel and the evolution of hydrogen from plate X during overcharge and from plate Y during overdischarge. This is easily achieved by placing in parallel with the device two diodes in parallel having opposite polarity, as shown in FIGURE 8. During overcharging, when the voltage across the device exceeds the forward voltage for diode $D_2$ (approximately 0.3–0.6 v.), a large fraction of the overcharging current passes through this diode rather than the device. Similarly during overdischarge, when the device voltage exceeds the forward voltage for diode $D_1$, a large fraction of the overdischarge current passes through $D_1$. However, during normal charge and discharge, the voltage across the device is always small by comparison with that of the battery voltage.

through the cell the reversible reactions occurring at the electrodes are represented by the equation $$2OH^- + Cd \rightleftharpoons Cd(OH)_2 + 2e^-$$

the net composition of said electrolyte remaining constant while said reactions are occurring;
(d) the quantity of said active material at one of said electrodes being chosen in accordance with a predetermined coulometric capacity for the cell, and the quantity of active material at the other electrode being at least equal to the first mentioned quantity;
(e) whereby
 (i) the voltage between said electrodes will be substantially zero while current is flowing through said cell causing said reactions to occur, and
 (ii) the voltage between said electrodes will exhibit an abrupt change to a voltage substantially different from zero while current is flowing through said cell causing one of said reactions at one electrode to approach completion corresponding to substantially complete utilization of one of said states of said active material at that electrode and consequently the onset of a transition at that electrode from the electrochemical processes defined by said equation.

2. An electrochemical cell according to claim 1 in combination with an external electric circuit which is responsive to a level of voltage which is between substantially zero and said voltage substantially different from zero.

3. An electrochemical cell according to claim 1, wherein, when the active material on one electrode is entirely in the oxidized state, the other electrode bears substantially an electrochemically corresponding amount of the active material in the reduced state together with an additional amount of the active material in the oxidized state.

TABLE I.—TYPICAL ELECTRODE COMBINATIONS

| | Plate X | | | Electrolyte | Plate Y | | |
|---|---|---|---|---|---|---|---|
| | Discharge | Charge | Overcharge | | Discharge | Charge | Overcharge |
| (1) | $Cd(OH)_2 \rightarrow Cd°$ | $Cd° \rightarrow Cd(OH)_2$ | $O_2$ Evolution | Aqueous KOH Solution. | $Cd° \rightarrow Cd(OH)_2$ | $Cd(OH)_2 \rightarrow Cd°$ | $H_2$ Evolution. |
| (2) | Higher Ni oxide→$Ni^{2+}$. | $Ni^{2+}$→higher Ni oxide. | ...do... | ...do... | $Ni^{2+}$→higher oxide. | Ni Higher Ni oxide→$Ni^{2+}$. | Further reduction with probable eventual $H_2$ evolution with voltage steps. |
| (3) | Ag oxides→Ag° | Ag°→Ag oxides | $O_2$ Evolution after series of voltage steps. | ...do... | Ag°→Ag oxides | Ag oxides→Ag° | $H_2$ Evolution. |
| (4) | AgCl→Ag° | Ag°→AgCl | $Cl_2$ Evolution | Aqueous Chloride Solution. | Ag°→AgCl | AgCl→Ag° | Do. |
| (5) | $PbSO_4$→Pb° | Pb°→$PbSO_4$ | $PbSO_4$→$PbO_2$ | Aqueous $H_2SO_4$ Solution. | Pb°→$PbSO_4$ | $PbSO_4$→Pb° | Do. |
| (6) | $PbO_2$→$PbSO_4$ | $PbSO_4$→$PbO_2$ | $O_2$ Evolution | ...do... | $PbSO_4$→$PbO_2$ | $PbO_2$→$PbSO_4$ | $PbSO_4$→Pb°. |
| (7) | HgO→Hg° | Hg°→HgO | ...do... | Aqueous KOH Solution. | Hg°→HgO | HgO→Hg° | $H_2$ Evolution. |
| (8) | $MnO_2$→$Mn^{3+}$ | $Mn^{3+}$→$MnO_2$ | $O_2$ Evolution and further oxidation. | ...do... | $Mn^{3+}$→$MnO_2$ | $MnO_2$→$Mn^{3+}$ | Further reduction. |
| (9) | $Cu^{+2}$→Cu° | Cu°→$Cu^{+2}$ | $O_2$ Evolution from Pt support. | Aqueous copper ion solution with $H_2SO_4$. | Cu°→$Cu^{+2}$ | $Cu^{+2}$→Cu° | Further deposition of copper. |
| (10) | $ZnO_2^{--}$→Zn | Zn→$ZnO_2^{--}$ | $O_2$ Evolution from substrate. | Neutral or alkaline ammonium salt or KOH+ZnO. | Zn→$ZnO_2^{--}$ | $ZnO_2^{--}$→Zn | Further deposition of Zn. |

I claim:
1. An electrochemical coulometer cell comprising:
(a) a vessel containing a single body of alkaline electrolyte;
(b) a pair of reversible electrodes mounted in contact with said electrolyte;
(c) each electrode consisting essentially of an inert support and solid active material that is insoluble in said electrolyte, said active material being present in both its reduced and oxidized states, these states being respectively metallic cadmium and cadmium hydroxide, whereby upon passage of electric current

4. An electrochemical coulometer cell electrically connected in series with a secondary battery, said cell comprising:
(a) a vessel containing a single body of alkaline electrolyte;
(b) a pair of reversible electrodes mounted in contact with said electrolyte;
(c) each electrode consisting essentially of an inert support and solid active material that is insoluble in said electrolyte;

13

(i) said active material being present in both its reduced and oxidized states which are respectively metallic cadmium and cadmium hydroxide, whereby upon passage of electric current through the cell the reversible reactions occurring at the electrodes are represented by the equation $$2OH^- + Cd \rightleftharpoons Cd(OH)_2 + 2e^-$$

the net composition of said electrolyte remaining constant while said reactions are occurring, (ii) when the battery is fully charged the active material of a first of said electrodes is substantially in the oxidized state and the active material of the second of said electrodes is present in the reduced state in substantially an electrochemically corresponding amount, whereby commencing from said battery fully charged, upon battery discharge current flowing through the cell, reduction of the active material will occur at said first electrode and oxidation of the active material will occur at said second electrode, and thereafter upon passage through the cell of battery charging current oxidation of the active material will occur at said first electrode and reduction of the active material will occur at said second electrode;

(d) the quantity of said active material at one of said electrodes being chosen to give a predetermined coulometric capacity for said cell which is related to the coulometric capacity of said secondary battery, and the quantity of active material at the other electrode being at least equal to the first mentioned quantity;

(e) whereby
(i) the voltage between said electrodes will be substantially zero while current is flowing through said cell and said secondary battery causing said reactions to occur in said cell,
(ii) the voltage between said electrodes will exhibit an abrupt change to a voltage substantially different from zero while current is flowing through said cell causing one of said reactions at one electrode to approach completion corresponding to substantially complete utilization of one of said states of said active material at that electrode and consequently the onset of a transition at that electrode from the electrochemical processes defined by said equation, and
(iii) said abrupt change to a voltage substantially different from zero will occur when the quantity of electricity passing through the cell during said charging of the battery exceeds a quantity which is substantially equal to the quantity of electricity which has passed through the cell during said discharge of the battery.

5. An electrochemical cell electrically connected in series with a secondary battery, according to claim 4, in combination with an external electric circuit adapted to limit the voltage between the electrodes of said cell to a value below the gas evolution voltage.

6. An electrochemical cell electrically connected in series with a secondary battery, according to claim 4, wherein said inert support comprises a porous sintered nickel matrix and wherein said active material is carried with the pores of said matrix.

7. An electrochemical cell electrically connected in series with a secondary battery, according to claim 4 in combination with an external circuit adapted to control the charging current said circuit being responsive to a level of voltage which is between substantially zero and said voltage substantially different from zero.

8. An electrochemical coulometer cell comprising:
(a) a vessel containing a single body of alkaline electrolyte;

14

(b) a pair of reversible electrodes mounted in contact with said electrolyte;
(c) each electrode consisting essentially of an inert support and active material present in both its reduced and oxidized states, the reduced state of said active material being selected from metallic mercury and metallic zinc, whereby upon passage of electric current through the cell the reversible reactions occurring at the electrodes are respectively respresented by the equations $$2OH^- + Hg \rightleftharpoons HgO + H_2O + 2e^-$$

and $$4OH^- + Zn \rightleftharpoons ZnO_2^{--} + 2H_2O + 2e^-$$

the net composition of said electrolyte remaining constant while said reactions are occurring;

(d) the quantity of said active material at one of said electrodes being chosen in accordance with a predetermined coulometric capacity for the cell, and the quantity of active material at the other electrode being at least equal to the first mentioned quantity;

(e) whereby
(i) the voltage between said electrodes will be substantially zero while current is flowing through said cell causing said reactions to occur, and
(ii) the voltage between said electrodes will exhibit an abrupt change to a voltage substantially different from zero while current is flowing through said cell causing one of said reactions at one electrode to approach completion corresponding to substantially complete utilization of one of said states of said active material at that electrode and consequently the onset of a transition at that electrode from the electrochemical processes defined by said equations.

9. An electrochemical coulometer cell comprising:
(a) a vessel containing a single body of alkaline electrolyte;
(b) a pair of reversible electrodes mounted in contact with said electrolyte;
(c) each electrode consisting essentially of an inert support and solid active material that is insoluble in said electrolyte, said active material being present in both its oxidized and reduced states, the reduced state of said active material being selected from metallic silver, divalent nickel and trivalent manganese, whereby upon passage of electric current through the cell the reversible reactions occurring at the electrodes are respectively represented by the equations Metallic silver $\rightleftharpoons$ silver oxides Divalent nickel $\rightleftharpoons$ higher nickel oxides and Trivalent manganese $\rightleftharpoons$ manganese dioxide the net composition of said electrolyte remaining constant while said reactions are occurring;

(d) the quantity of said active material at one of said electrodes being chosen in accordance with a predetermined coulometric capacity for the cell, and the quantity of active material at the other electrode being at least equal to the first mentioned quantity;

(e) whereby
(i) the voltage between said electrodes will be substantially zero while current is flowing through said cell causing said reactions to occur, and
(ii) the voltage between said electrodes will exhibit an abrupt change to a voltage substantially different from zero while current is flowing through said cell causing one of said reactions at one electrode to approach completion corresponding to substantially complete utilization of one of said states of said active material at that electrode and consequently the onset of a transition at that electrode from the electrochemical processes defined by said equation.

References Cited by the Examiner

UNITED STATES PATENTS

| | | | |
|---|---|---|---|
| 2,832,734 | 4/1958 | Eckfeldt | 324—94 |
| 2,988,590 | 6/1961 | Andre | 324—29 X |
| 3,131,348 | 4/1964 | Taylor et al. | 324—94 |

FOREIGN PATENTS 254,852  3/1926  Great Britain.

OTHER REFERENCES

Vinal: Storage Batteries (4th ed.), 1955 pp. 66, 98–100, 202.

JOHN F. COUCH, *Primary Examiner.*

S. WEINBERG, *Assistant Examiner.*